United States Patent [19]
Rau et al.

[11] Patent Number: 5,488,534
[45] Date of Patent: Jan. 30, 1996

[54] TRANSIENT VOLTAGE SURGE SUPPRESSION MODULE WITH ULTRAFAST FUSING

[75] Inventors: C. Peter Rau, Tioga County, N.Y.; Thomas T. Hitch, Mercer County, N.J.

[73] Assignee: Emerson Electric Co., St. Louis, Mo.

[21] Appl. No.: 109,815

[22] Filed: Aug. 19, 1993

[51] Int. Cl.⁶ ............................................. H02H 9/04
[52] U.S. Cl. ........................ 361/56; 361/111; 361/127
[58] Field of Search ............................. 361/56, 91, 111, 361/127

[56] References Cited

U.S. PATENT DOCUMENTS

| | | | |
|---|---|---|---|
| 4,223,366 | 9/1980 | Sweetana et al. | 361/127 |
| 4,271,446 | 6/1981 | Comstook | 361/56 |
| 4,498,119 | 2/1985 | Cronin | 361/386 |
| 4,554,607 | 11/1985 | Mora | 361/104 |
| 5,010,438 | 8/1991 | Brady | 361/56 |

*Primary Examiner*—Todd DeBoer
*Attorney, Agent, or Firm*—Polster, Lieder, Woodruff & Lucchesi

[57] ABSTRACT

A transient voltage surge suppressor (100) for use in a single or poly-phase power distribution network to protect equipment supplied power from the network from damage caused by line surges or transients. A plurality of surge suppression assemblies (102A–102G) each of which includes a plurality of semiconductors (114) connected in parallel and a fuse wire (118) connected in series with each semiconductor. Each assembly is mounted on a separate circuit board (126A–126G). A fault detection circuit (104) in each assembly includes both a sensor (132A–132G) for sensing when a semiconductor in one of the surge suppression assemblies fails, or when a fuse wire in one of the assemblies clears, and a circuit (152) for providing a visual indication thereof. The fault detector is mounted on a separate circuit board (131). The respective circuit boards are installed in a module (120) with the one set of circuit boards on which the surge suppression assemblies are mounted being installed in one plane, and the circuit board on which the fault detector is mounted being installed perpendicular to them. A plasma suppression medium includes a sand and epoxy material for preventing spread of a plasma produced when a semiconductor fails or a fuse wire clears. The sand and epoxy material fill the module including the spaces between the circuit boards to prevent the spread of any plasma created due to semiconductor failure or fuse wire clearing.

20 Claims, 6 Drawing Sheets

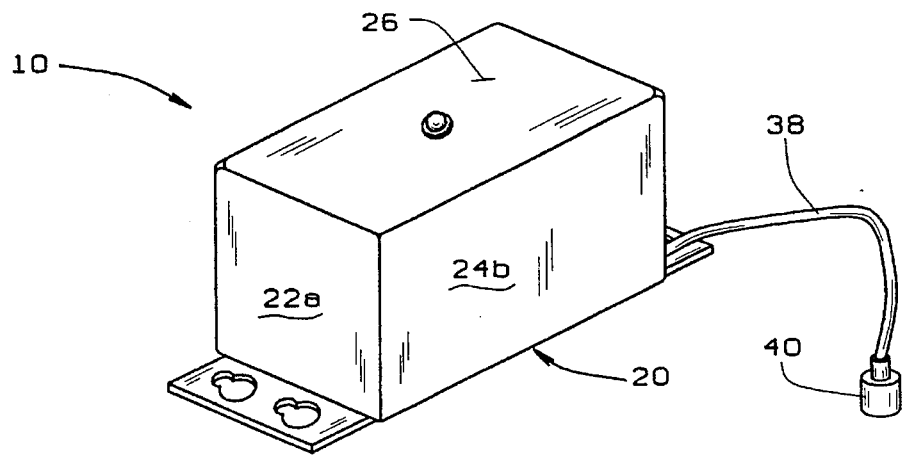
FIG. 1
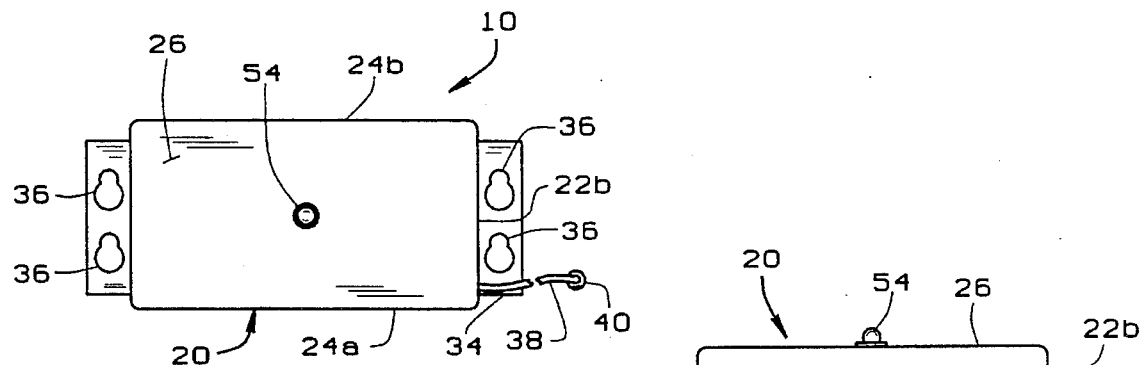
FIG. 2A
FIG. 2B
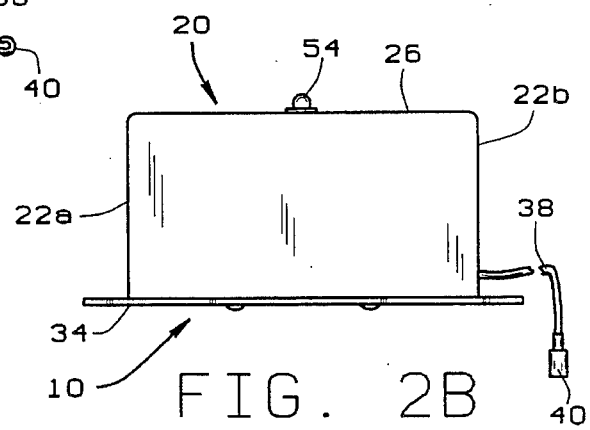
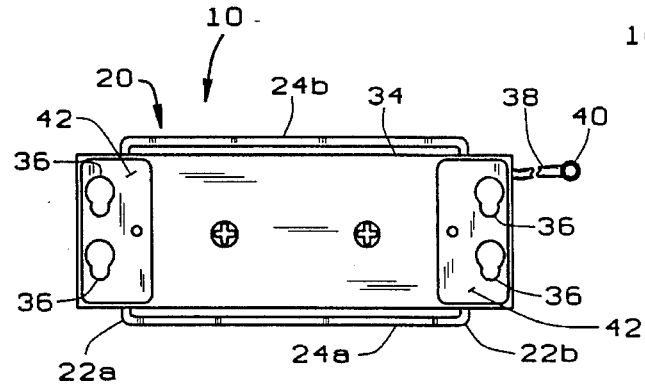
FIG. 2C
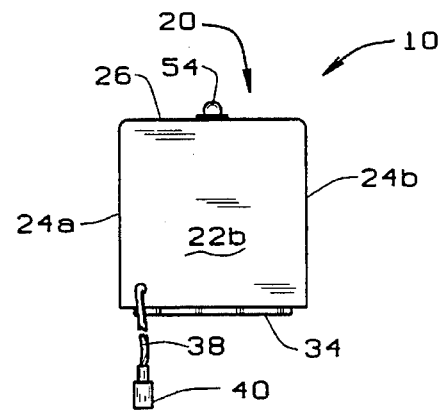
FIG. 2D

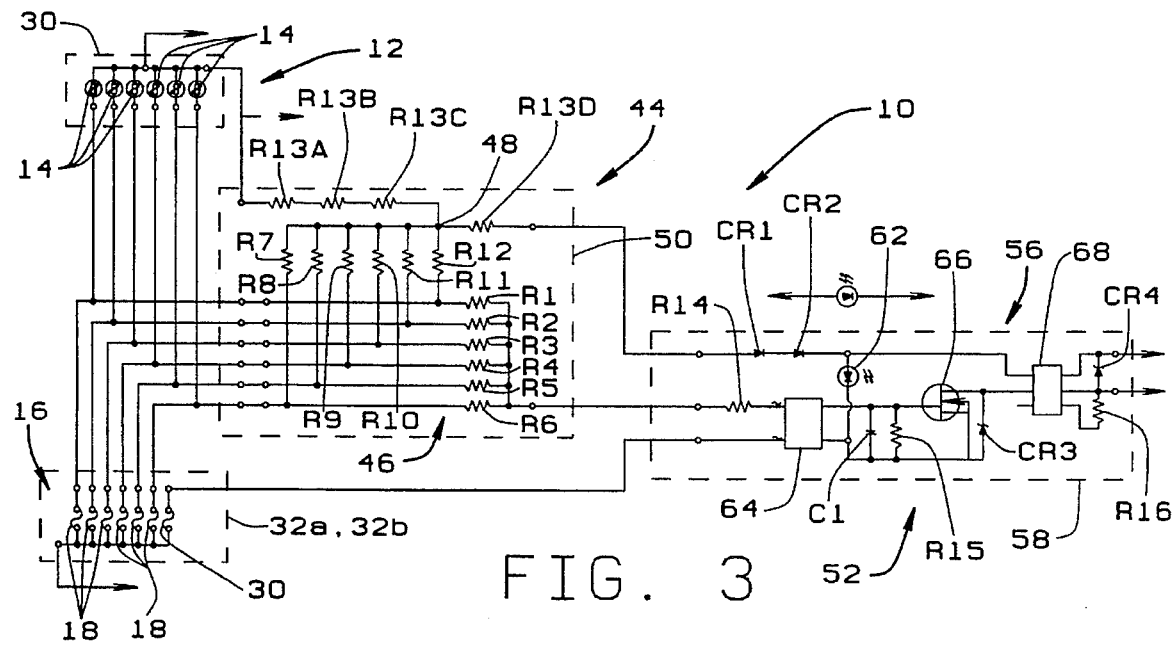
FIG. 3
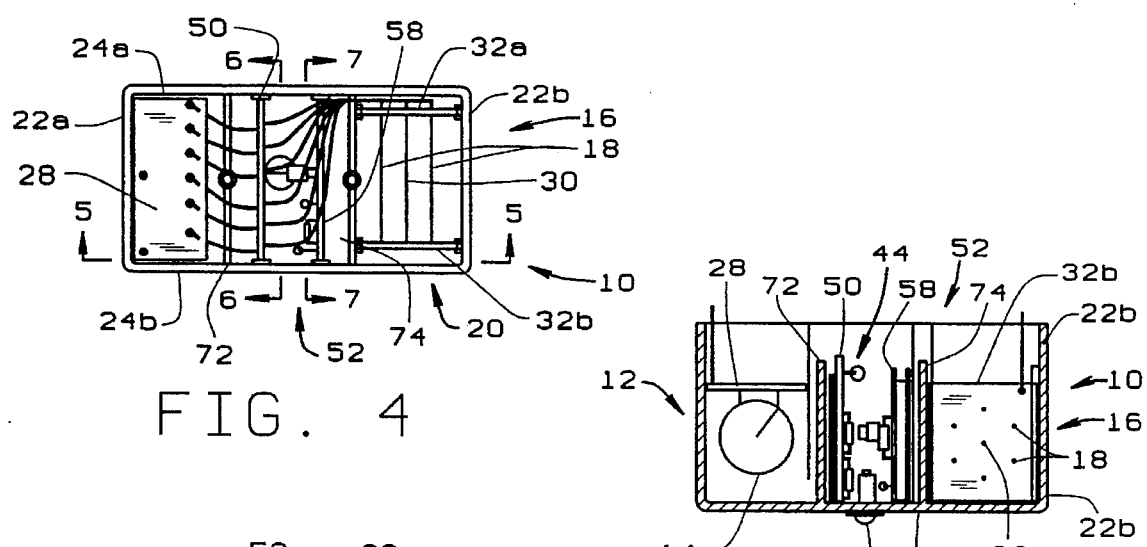
FIG. 4
FIG. 5
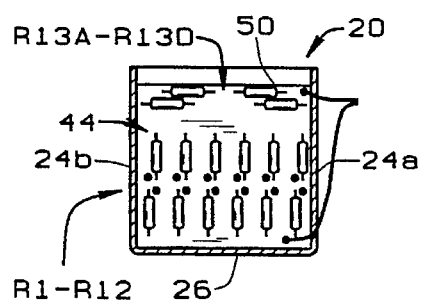
FIG. 6
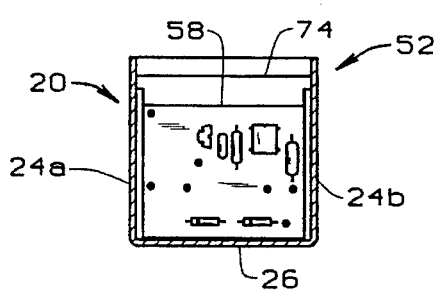
FIG. 7

TRANSIENT VOLTAGE SURGE SUPPRESSION MODULE WITH ULTRAFAST FUSING

BACKGROUND OF THE INVENTION

This invention relates to the protection of electrical components in computers and the like from electrical transients or surges caused, for example, by lightning and, more particularly, to a modular transient voltage surge suppressor (TVSS) having ultrafast fusing which prevents the plasma produced by a surge occurring in one part of a TVSS from causing subsequent damage in other parts of the TVSS.

TVSS devices are used with computers and similar equipment to protect them from electrical line surges caused by lightning or other transient conditions. TVSS devices are modular systems and may be connected in series or parallel as necessary. A particular advantage of the TVSS modules is they allow connections into electrical switchgear, or other electrical main service, without requiring external fusing. The modules have been tested and proved to withstand up to a 300 kA fault current at 600 V.

In operation, TVSS devices limit the peak voltages occurring in power line or electronic circuits since the components in computers and related equipment in these circuits can be damaged by a transient voltage condition resulting from a voltage surge. Strategic placement of TVSS devices mitigates the effect of voltage transients so they do not damage the system. Often, the device performs transient voltage suppression by functioning as a current diverter. In these instances, it presents a low impedance path for surge currents as compared to the impedance level of the protected circuits and equipment. Under normal operating conditions, a TVSS circuit draws very little current. And, as the voltage applied across the circuit increases above the design voltage level, the impedance of the TVSS circuit dramatically falls. This is highly desirable, because, for effective surge current diversion, very low impedance is required. For most effective TVSS operation, a non-linear voltage-current relationship is required for the suppression device. Solid-state TVSS devices use metal-oxide varistors (MOV's) or silicon avalanche diodes (SAD's) for this reason.

Despite the advantage of TVSS devices, they do have drawbacks. One of these is that energy delivered to a TVSS device is dissipated as heat. The more energy delivered to the device, the hotter the device becomes. If it gets too hot, as a result of a particularly large overvoltage transient, the device will fail. When it fails catastrophically, its SAD or MOV can partially vaporize. When this happens, the vapor can conduct electrical current. If sufficient voltage and current are available, a plasma forms which has several dangerous properties. It carries current and consequently bridges the current to any electrical metal contact it touches. The plasma may also bridge insulating spaces and short busses and wiring. This can result in damage to circuitry formerly protected or to other input equipment at the ac power input to the computer, and the surrounding equipment. The plasma releases heat which both destroys components and chars electrical insulation.

Failure of a TVSS device used on ac power lines then has several potential consequences. If the electronic components which the device is to protect includes other protection circuitry, there may be no resultant damage. On the other hand, if the line transient is so great that vaporization occurs, smoke or fire may result. At an extreme, an explosion so violent could occur that severe structural damage to the office, laboratory, or factory results. Personnel could be injured or killed.

In the design of TVSS equipment using MOV's or SAD's, the semiconductor device may have an associated fuse. Failure of a MOV or SAD is usually accompanied by a clearing (blowing) of its associated fuse as well. Catastrophic loss of either creates the vaporized metal condition described above and the attendant hazards of expanding plasma. Previous designs of the equipment have included some type of cover for one or the other to prevent dispersion of a metal vapor. This, however, is insufficient to afford the type of protection needed.

SUMMARY OF THE INVENTION

Among the several objects of the present invention may be noted the provision of a safe TVSS module; the provision of such a TVSS module incorporating circuitry and components which minimize any plasma created in the event of a failure, contain any plasma which is created, and absorb the plasma so it is not released outside the module; the provision of such a TVSS module which acts to minimize the amount of plasma created by a) fast current limiting, b) fast arc quenching, c) using components capable of withstanding high voltage levels, and d) co-ordinating the failure energy of TVSS components with fuses used in the module; the provision of such a TVSS module to use fuses made of a material having an extremely low oxidation energy compared with most other metals to reduce the amount of heat generated; the provision of such a TVSS module in which TVSS semiconductor components and fuse elements are protected to prevent any plasma from contacting unfused electrical buses which would otherwise allow the plasma to travel and cause greater destruction; the provision of such a TVSS module to include a packing around TVSS components, and the fuse links, the packing being of a material which rapidly absorbs plasma energy thereby to extinguish any plasma which is produced in the event of a failure and to prevent its spread; the provision of such a TVSS module using semiconductors having associated fuses which, in one embodiment are isolated from each other, but which, in another embodiment are physically close to each other; the provision of such a TVSS module connected only across a single phase of a polyphase power distribution system; the provision of such a TVSS module having a plurality of suppression modules each of which is separately connected across each phase of a polyphase power distribution, between each phase and neutral, between each phase and ground, and between neutral and ground; the provision of such a TVSS module which is usable with computers or other equipment using solid-state components to protect the equipment from extremely high voltage spikes such as those caused by lightning; the provision of such a TVSS module in which all the components used are physically isolated from each other and the external environment to avoid a catastrophic occurrence and harm to personnel, equipment, and facilities; and, the provision of such a TVSS module which is easily installed and which provides a visual indication in the event of a fault so the user is aware when a module failure has occurred.

In accordance with the invention, generally stated, a transient voltage surge suppressor is suitable for use in both single-phase and poly-phase power distribution networks to protect equipment that is supplied power from an electrical power grid or a more local source from damage caused by line surges or transients. A plurality of surge suppression assemblies each includes a plurality of semiconductors connected in parallel and a fuse wire connected in series with each semiconductor. Each assembly is mounted on a separate circuit board. An assembly is connected between phases, and/or each phase and ground, and/or each phase and neutral, and/or ground and neutral. A fault detection circuit includes both a sensor for sensing when a semiconductor in one of the surge suppression assemblies fails, or when a fuse wire in one of the assemblies clears, and a circuit for providing a visual indication thereof. The fault detector is mounted on a separate printed circuit board (PCB). The respective circuit boards are installed in a module with the one set of circuit boards on which the surge suppression assemblies are mounted being installed in a planar arrangement, and the circuit board on which said fault detector is mounted being installed perpendicular to them. A plasma suppression medium includes a sand and epoxy material for preventing spread of a plasma produced when a semiconductor fails or a fuse wire clears. The sand and epoxy material fill the module including the spaces between the circuit boards to prevent the spread of any plasma created due to semiconductor failure or fuse wire clearing. Other objects and features will be in part apparent and in part pointed out hereinafter.

BRIEF DESCRIPTION OF THE DRAWINGS

FIG. 1 is a perspective view of a TVSS module of the present invention;

FIGS. 2A–2D are respective top plan, side elevational, rear elevational, and end elevational views of the module;

FIG. 3 is a schematic diagram of the TVSS module;

FIG. 4 is an interior view of the module with the rear cover of the module removed;

FIG. 5 is a sectional view taken along line 5—5 in FIG. 4;

FIG. 6 is a sectional view taken along line 6—6 in FIG. 4;

FIG. 7 is a sectional view taken along line 7—7 in FIG. 4;

Corresponding reference characters indicate corresponding parts throughout the drawings.

DESCRIPTION OF PREFERRED EMBODIMENTS

Figure 12:
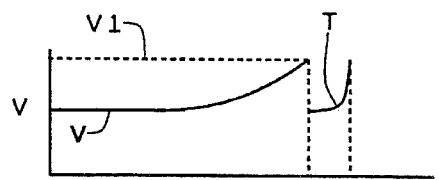
FIG. 12 is a curve representing the line voltage and the effect of line voltage changes during surges and transients on the TVSS module operation.
Figure 13:
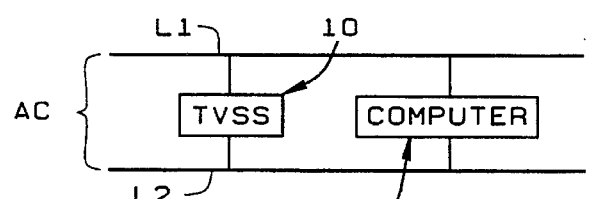
FIG. 13 illustrates installation of the module in a power arrangement for a using system.
Figure 14A:
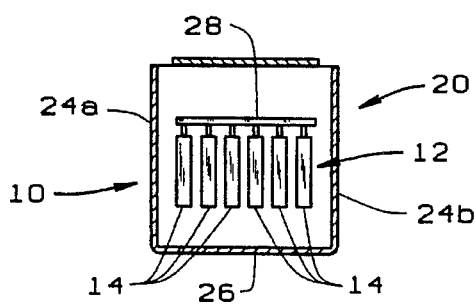
FIGS. 14A and 14B respectively represent end views of the module showing the installation of power semiconductor devices (FIG. 14A) and their associated fuse wires (FIG. 14B) within the module.
Figure 14B:
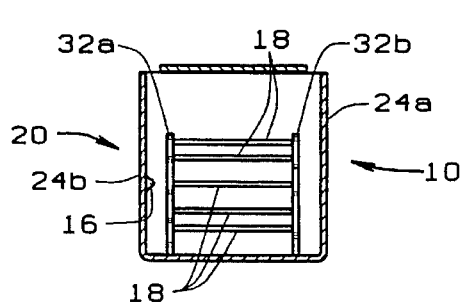

Referring to the drawings, a transient voltage surge suppressor (TVSS) is indicated generally 10 in the drawings. As shown in FIG. 13, the TVSS is connected across ac power lines L1, L2 to protect equipment E connected to the line from damage in the event of high voltage surges or transients. This equipment typically includes computer and computer peripheral equipment which incorporates semiconductor circuits in various forms. If the power service is three-phase, one or more TVSS modules 10 are used for each phase. The modules may be installed at the entrance to the main service for the equipment, as well as at various other power distribution locations. Module 10 includes semiconductor means 12 connected to the power line. These devices are power semiconductor devices such as metal-oxide varistors (MOV's) 14. They may also be silicon avalanche diodes (SAD's). A plurality of the devices, six, for example, are installed in the module. As shown in FIG. 3, the MOV's are connected in parallel with one side of the semiconductors commonly connected to one side of the ac power input. Referring to the left hand portion of FIG. 12, for normal line voltage V conditions, the MOV's are non-conducting. If an overvoltage condition such as a voltage surge occurs, the semiconductors switch into conduction when the voltage level reaches V1. When they conduct, the MOV's divert the surge current away from the equipment thereby protecting its semiconductor components from damage. When the line voltage falls back below the level V1, the MOV's switch back to their non-conducting states.

Module 10 further includes a fuse means 16 comprising a plurality of fuse wires 18. There is one fuse wire 18 for each semiconductor 14. Accordingly, there are six fuse wires. As indicated in the schematic of FIG. 3, each fuse wire is electrically connected in series to the other side of its associated semiconductor. The other end of all the fuse wires are commonly connected to the other side of the ac power input. The fuse wires act to protect the semiconductor from an excessively high voltage transient on the power lines. Referring to the right hand portion of FIG. 12, it will be appreciated that for a sharp voltage transient T, the voltage increase is very rapid. To prevent catastrophic failures of the MOV's when a transient T occurs, the fuses 18 clear first to break the circuit across the semiconductor devices. They will also clear and protect the module if an MOV fails catastrophically and initiates a plasma of sufficient current level.

The semiconductors 14 and their associated fuse wires 18 are installed in an open-faced cover 20. The cover is generally rectangular in shape and has endwalls 22a, 22b, sidewalls 24a, 24b, and front face 26. The height of the cover is sufficient to particularly accommodate the semiconductors. All six semiconductors are commonly mounted on a circuit board 28 for installation in the module. The six fuses 18, and a seventh fuse 30, whose function is described hereinafter, are installed between circuit boards 32a, 32b. As is described hereinafter, the circuit board with the semiconductors are installed at one end of the module, and the circuit boards with the fuse wires at the opposite end.

A mounting plate 34 is attached to cover 20 and fits over the open face of the cover. The mounting is longer than the cover and has a pair of keyhole shaped openings 36 at each end. These are formed in the respective end portions of the plate which extend beyond the end walls of the cover. The openings allow the assembled module to be installed in the main unit. An electrical cable 38 extends through endwall 22b of the cover. The cable has a connector 40 for connecting the module to transient monitoring equipment. Finally, conducting pads 42 are fitted on the backside of plate 34 to electrically connect the module to the main unit. Although not shown, the conducting pads are internally connected to the module by appropriate electrical leads.

In addition to the semiconductors and their fuse wires, TVSS module 10 includes means 44 for sensing the occurrence of a surge or transient. As shown in FIG. 3, means 44 includes a resistor network 46. Network 46 comprises twelve parallel connected resistors R1–R12. One set of six resistors R1–R6 are respectively connected in parallel between each semiconductor and its associated fuse wire. A second set of six resistors R7–R12 are similarly parallel connected. In addition, three resistors R13A–R13C are connected in series between the line side of the semiconductors 14 and a common point of the two sets of parallel connected resistors. All the resistors are commonly mounted on a circuit board 50 which is installed in module 10. If any of the fuses 18 clears, the resistor network senses a voltage which indicates that an extreme overvoltage condition has caused the module to fail-safe.

Module 10 also includes a fault detection means 52 which is responsive to sensing means 44 to provide a visual indication that an extreme overvoltage condition has caused the unit to fail. Module 10 includes an indicator lamp 54 which, as shown in FIG. 2A is mounted on front face 26 of cover 20. Lamp 54 is controlled by a control circuit 56. The control circuit is installed on a circuit board 58 which is mounted in module 10. control circuit 56 includes a dc optocoupler 68 which conducts when a failure has occurred. If an MOV fails and forms a closed circuit, the resulting voltage produced at common point 48 is applied through a resistor R13D and series connected diodes CR1, CR2 to one input of a light emitting diodes (LED) 62. The LED is biased to be normally conducting and lamp 54 is illuminated. Sensing of the failure condition switches the LED out of its conduction mode turning lamp 54 off. The network sensing output is then applied, through a resistor R14 to one input of a rectifier bridge 64 which converts the ac input signal to a dc output. Fuse 30 protects bridge 64. The bridge output gates a field-effect transistor (FET) 66 to reverse bias LED 62 out of conduction. The gate input to the FET is filtered by a parallel connected capacitor C1 and resistor R15. Regardless of whether the sensing output of means 44 is caused by the failure of a semiconductor or a fuse wire, the sensing signal from network 46 is provided as an input to a dc optocoupler 68. (The input through FET 66 is developed across a zener diode CR3 to control the input level.) The optocoupler is responsive to either input to provide an output signal to other monitoring devices. This output is developed across a zener diode CR4 and a resistor R16.

Referring again to FIG. 12, in previous transient voltage surge suppression designs, when a very large voltage surge or high voltage transient occurs, there was a probability that either a fuse wire or a power semiconductor would fail catastrophically. In such circumstance, the semiconductor or fuse wire could be literally vaporized. Upon vaporization, a plasma was created which included vaporized metal. As the plasma spread, it served as a conductor, spreading the surge or transient to whatever other devices it contacted. The resultant ripple effect could produce tremendous damage. Explosions are known to have resulted from this plasma arcing from one point to another. And, because of the devastation, the specific source of the energy release was not always easy to determine.

To prevent this situation from occurring in module 10, the module, and its components, have been novelly designed to minimize or eliminate the possibility of catastrophic occurrences. The module incorporates three design strategies:

a) plasma minimization;

b) plasma containment; and, c) plasma absorption.

With respect to the first of these strategies, plasma minimization includes, for example, making cover 20 and mounting 34 out of a lightweight plastic or fiberglass material. Previous TVSS modules typically had a metallic case. In the event of an explosion, the vaporized case simply added more vaporized metallic material to the plasma further helping spread the destruction. With a plastic case, the amount of plasma produced is thus limited to the components within the module, and those are protected.

Next, the wire fuses 18 and 30 are each silver wire fuses. This not only provides a current limiting function; but silver, unlike copper or aluminum, has an extremely low oxidation energy. When it fuses, it does not burn as does a copper or aluminum wire. This further reduces the potential amount of plasma which can be produced. Also, the fuse wires are 1.6 in. (4.1 cm.) long. A shorter length would lower the restrike voltage and make an arc produced after a fuse wire melts harder to extinguish. This is complicated by the inductive nature of the wiring to a TVSS module which can force the voltage, in the event of a failure, to a level which makes it even more difficult to extinguish the arc.

In module 10, the current circuitry described above and including the MOV's 14, must react very quickly to excessive current. Thermal avalanche of a MOV occurs in microseconds ($10^{-6}$ sec.). Any lag time or delay in fuse clearing results in higher thermal energy being expended by the MOV's. The circuitry and components included in module 10 are designed such that the current limit point, i.e., the current level at which the energy to clear the fuse would cause its associated MOV to explode and burn, is not exceeded.

With respect to the second strategy of plasma containment, unless plasma is contained, unfused bus electrodes will be shorted when the plasma reaches them. The plasma's conductivity then transmits the high level current produced by the surge or transient to the circuitry connected to the electrodes. If the electrodes are made of aluminum, as they vaporize and oxidize, large amounts of heat and gas are released. To contain any plasma, module 10 includes a plasma suppression means 70. Means 70, which is best shown in FIGS. 8–11, prevents the spread of a plasma produced upon failure of a semiconductor or a fuse wire.

Figure 8:
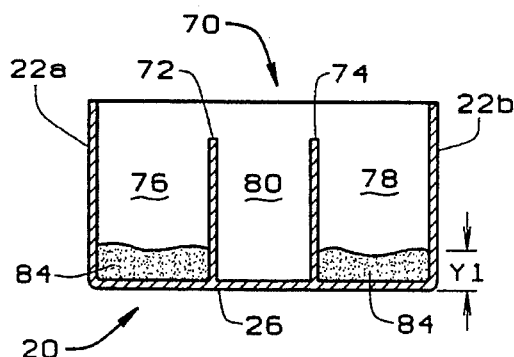
FIG. 8 represents a first stage in the fabrication process of the module.
Figure 9:
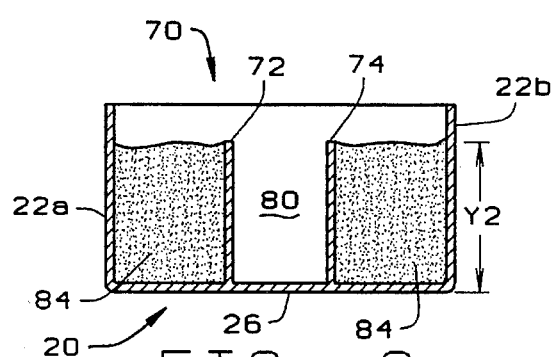
FIG. 9 represents a second stage in the process.
Figure 10:
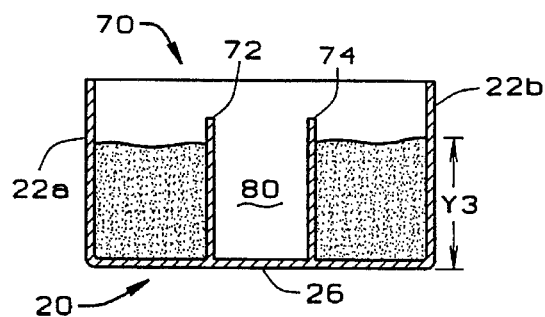
FIG. 10 represents a third stage in the process.
Figure 11:
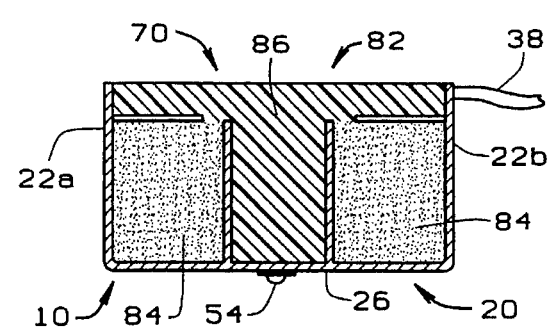
FIG. 11 represents a final stage in the process.

Means 70 first includes a first barrier 72 and a second barrier 74. These barriers each comprise a wall integrally formed with cover 20 and extending from front face 26 of the cover rearwardly toward the open end of the cover over which mounting plate 34 is fitted. The barriers are used to define compartments 76, 78 respectively into which the semiconductors 14 and fuse wires 18 are installed. As shown in FIG. 8, compartment 76 is formed at one end of the module by barrier wall 72, cover endwall 22a, and the cover sidewalls 24a, 24b. Compartment 78 at the opposite end of the module is formed by barrier wall 74, cover endwall 22b, and the cover sidewalls. The barrier walls and the cover sidewalls further define a central compartment 80.

As previously described, the MOV's 14 are mounted on circuit board 28. The circuit board is sized to fit in compartment 76 with the MOV's extending forwardly toward the front face of cover 20. Circuit boards 32a, 32b between which fuse wires 18, 30 are mounted is installed in compartment 78 so circuit board 32a is parallel to sidewall 24a, and board 32b is parallel to sidewall 24b. Circuit board 50 with the resistors R1–R13D mounted on it is mounted on one side of center compartment 80. The circuit board is positioned adjacent to barrier wall 72 and with the resistors facing inwardly toward the center of the compartment. Similarly, circuit board 58 with lamp control circuit 52 mounted on it is installed on the opposite side of the compartment with the circuit components again facing inwardly toward the center of compartment 80.

Plasma suppression means 70 also includes means 82 (again see FIGS. 8–11) for encapsulating both the semiconductors 14 and fuse wires 18. By encapsulating these elements, the third strategy of plasma absorption is implemented. This is because any vaporized metal produced cannot now spread to other components, but is instead absorbed by the encapsulation material. Encapsulation means 82 includes filling both compartments 76 and 78 with a silica sand, and then covering the sand and filling compartment 80 with an epoxy based material. The silica sand is a clean silica sand of tyler sieve size −60+200 or, similar packaging material could be used. During assembly of module 10, compartments 76 and 78 are first filled with a layer Y1 of sand 84. See FIG. 8. Next, the various circuit boards are installed and appropriate electrical connections made. Then, the remaining space in the compartments are filled with sand. See FIG. 9. The module is now vibrated to compact the sand. After compaction, the layer Y3 of sand (see FIG. 10) is shallower than the level Y2 of sand shown in FIG. 9. More sand is then added to each compartment to refill them back to the top. The refill/vibration procedure may be repeated until each compartment is filled with compacted sand. Now, an epoxy sealing material 86 is poured over the top of the sand in compartments 76 and 78 and into compartment 80. The epoxy material is, for example, an Insulcast 116 FR Part A/B and Insulcast 116 FR Part A/B FC or, other similar materials. Compartment 80 is filled with the epoxy.

The advantage of the separation and encapsulation of the semiconductors, fuse wires, and sensing and control circuitry is that in the event of a destructive surge or transient, the unfused electrodes are physically separated from any plasma source. Next, by tightly packing silica sand around the semiconductors and fuse wires, any plasma which is produced is rapidly extinguished. The sand has both a high heat capacity and a high melting temperature. Also, it provides a thermal insulation keeping the heat generated by any plasma from melting cover 20.

Figure 15:
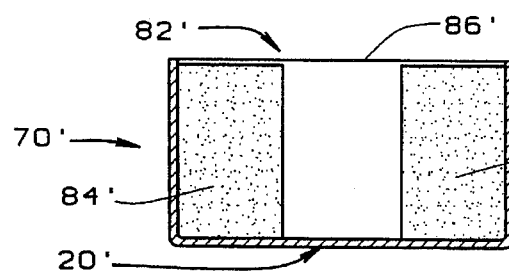
FIG. 15 illustrates an alternate encapsulation construction.
Figure 16:
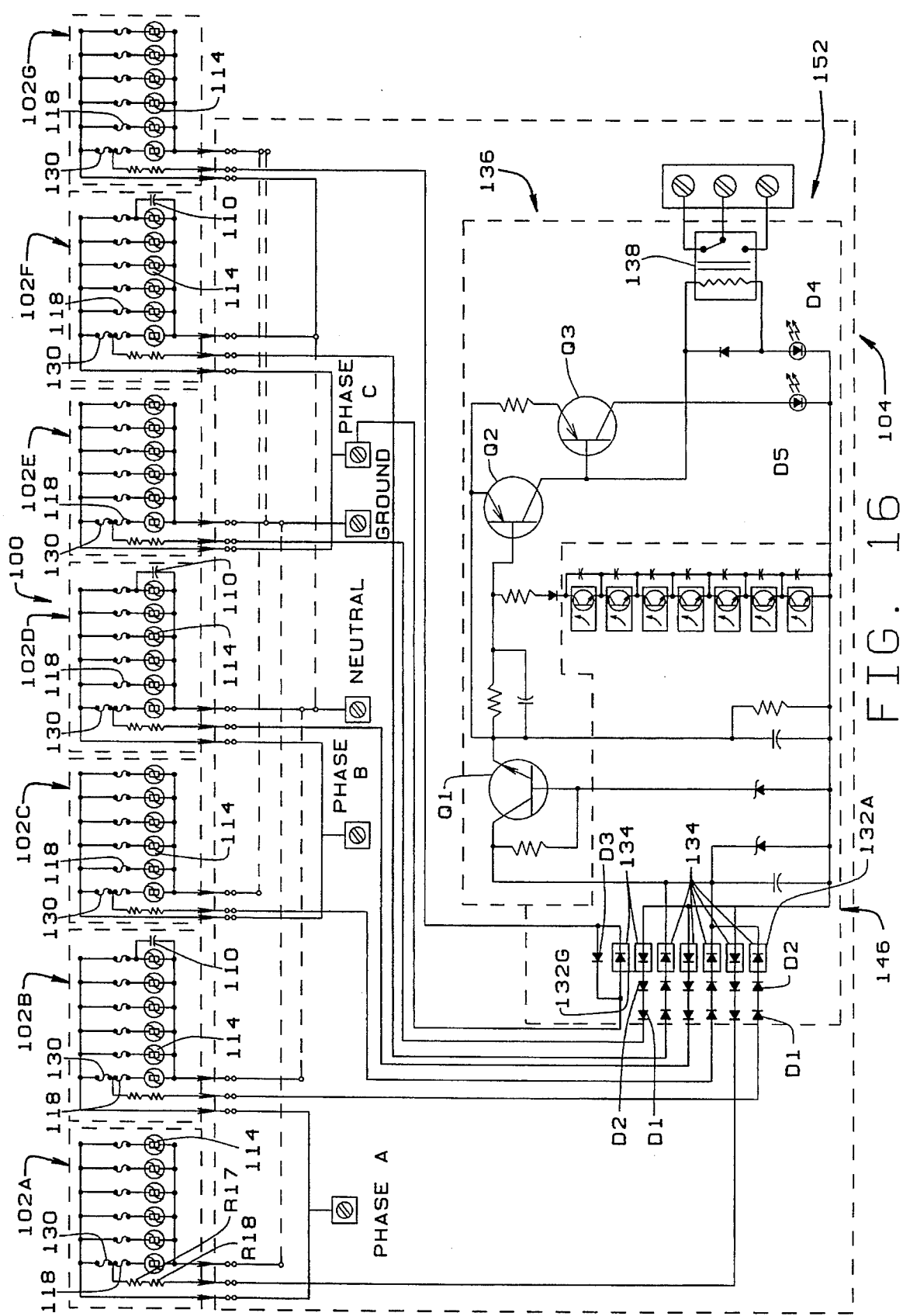
FIG. 16 is a schematic of another embodiment of a TVSS in which a plurality of surge suppression assemblies are commonly housed in a single module.

Referring to FIG. 15, a second embodiment 70' of the plasma suppression means does not include the barrier walls of the prior embodiment. Rather, a means 82' relies on encapsulation of the semiconductors and fuse wires in compacted silica sand 84', their placement inside opposite ends of a cover 20' and coating the compacted sand and the central area of the cover with an epoxy material 86'. Performance of means 70' as described above is to contain and absorb any plasma.

Figure 17:
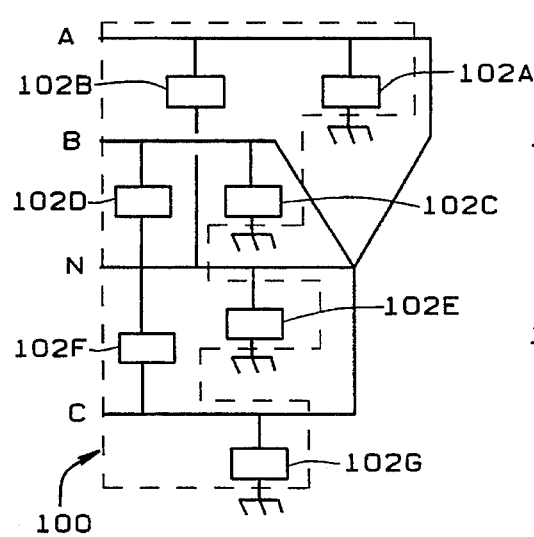
FIG. 17 illustrates a three-phase Y arrangement with surge suppression assemblies connected between each phase and neutral, each phase and electrical ground, and between neutral and electrical ground.

Referring to FIGS. 16–23, a third embodiment of a TVSS module of the present invention is indicated generally 100. Module 100 differs from modules 10 and 10' in a number of significant ways. First, modules 10 and 10' each contained only a single surge suppression assembly. Each module was therefore connectable only across a single phase of a polyphase power distribution network. Module 100 includes up to eight surge suppression assemblies indicated 102A–102G in FIG. 16. In FIG. 17, connection of the various assemblies is shown in a three-phase Y power distribution scheme. Here, assemblies 102A, 102C, and 102E are connected between each respective phase A, B, and C, and electrical ground. Similarly, assemblies 102B, 102D, and 102F are connected between the respective phases and neutral N. Lastly, assembly 102G is connected between neutral N and electrical ground. A fault detection circuit 104 includes sensing means 146 for sensing when any fuse 130 in any assembly clears, or an MOV fails, so an appropriate failure indication can be given.

Unlike module 10 where the MOV's 14 were installed on one board 30, and the fuses 18 were separately installed between two boards 32a, 32b, in module 100, the MOV's 114, and their associated fuse wires 118 are all commonly mounted on the same printed circuit board In modules 10 and 10' the circuit boards with the MOV's were installed on one side of the module, and the circuit boards with the fuses, on the opposite side. Further, the respective circuit boards were separated by walls 72, 74. The physical separation, together with encapsulation of the MOV's and fuse wires, in compacted, epoxy covered sand, insured that failure of a MOV, or a fuse clearing did not propagate plasma. In module 100, there is no comparable spatial separation of the MOV's and their associated fuses.

Figure 18:
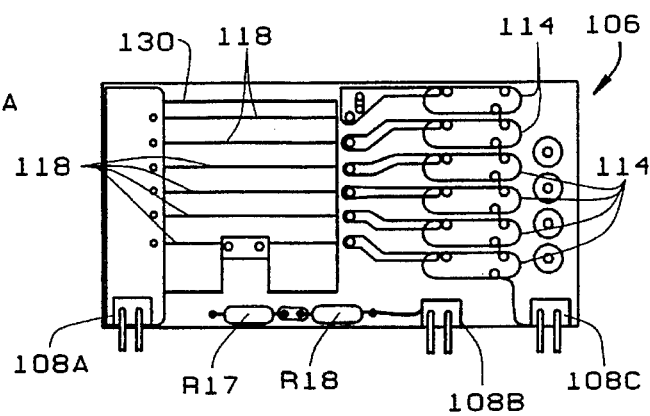
FIG. 18 is an elevational view of a printed circuit board (PCB) on which a surge suppression assembly is installed.

Each surge suppression assembly includes six MOV's, each having an associated fuse wire 118. The assemblies 102A–102G are respectively mounted on boards 106A–106G. One such board is shown in FIG. 18. Wiring between each board and sensing means 146 is through series connected resistors R17 and R18. Each board has three sets of terminals 108A–108C. Terminals 108A and 108C are used to connect the surge suppression assembly across the desired "phase". As used herein, the term "phase" means any current carrying conductor, or ground. Terminal 108B connects the respective board 106 to the fault sense means.

Figure 19:
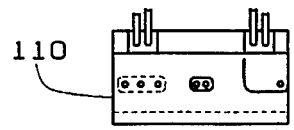
FIG. 19 is an elevational view of a filter capacitor installed on a PCB for a surge suppression assembly connected between one of the phases and neutral.
Figure 22:
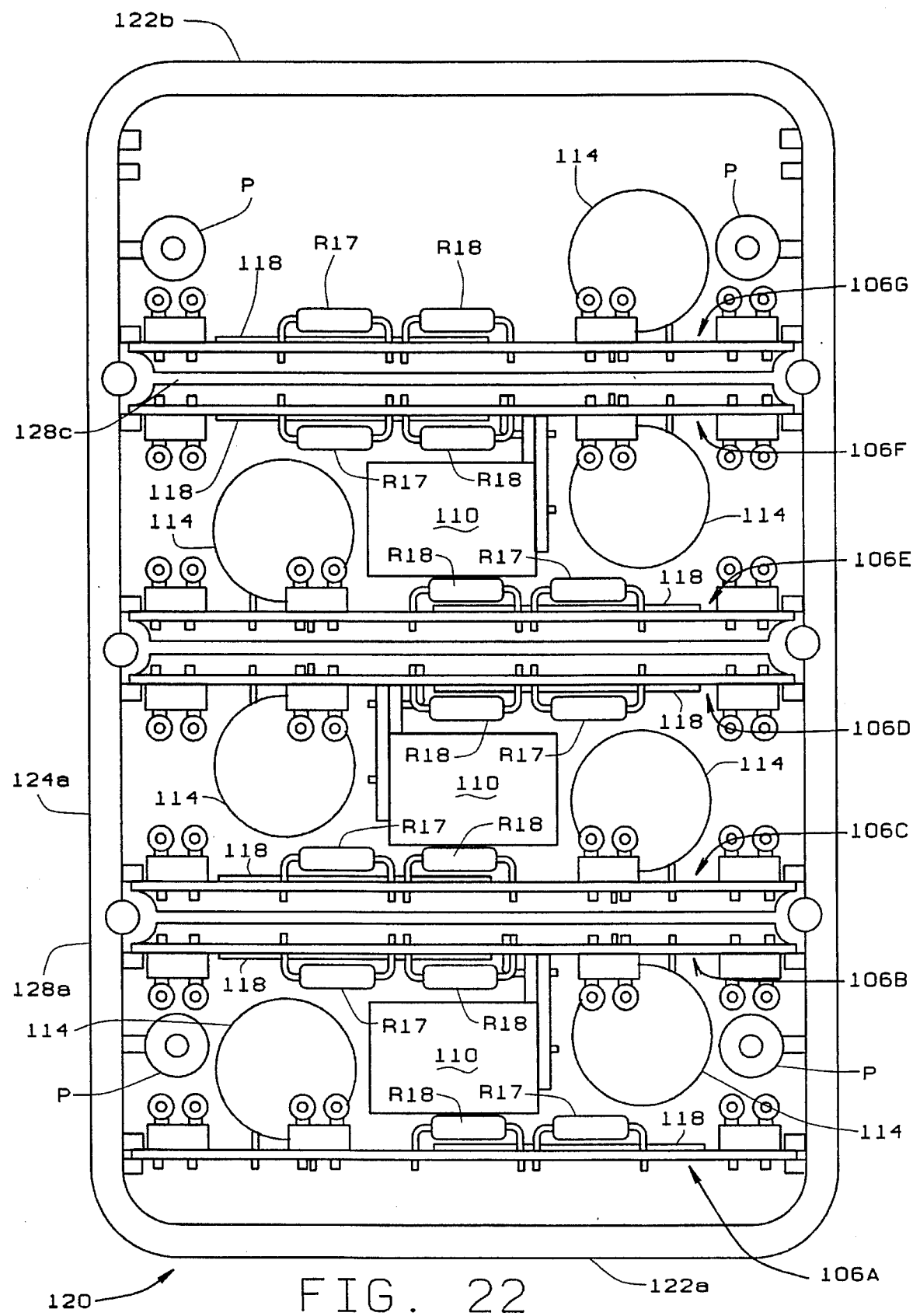
FIG. 22 is a plan view similar to FIG. 20, but with the PCB's installed in the module cover; and, FIG. 23 is plan view similar to FIG. 22 but with the surge suppression PCB's covered by a PCB with control logic.

Surge suppression assemblies 102B, 102D, and 102F each include a capacitor 110 as shown in FIG. 19. Each of these assemblies is connected between one of the respective phases and neutral. The capacitor acts as a filter capacitor to improve the performance of these particular assemblies. In this regard, the capacitors act to filter out both spikes and voltage ringing on the power line thereby limiting the level of heat the MOV's must dissipate. As shown in FIG. 22, the capacitor is mounted on the appropriate circuit board. It will be understood that the assemblies do not have to include a capacitor. In such instance, the assembly will still have surge suppression, but no filtering.

Figure 20:
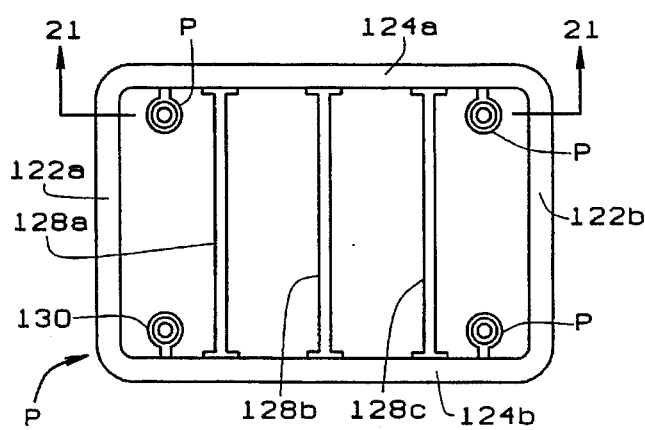
FIG. 20 is a top plan view of a module cover in which the surge suppression assemblies are installed.
Figure 21:
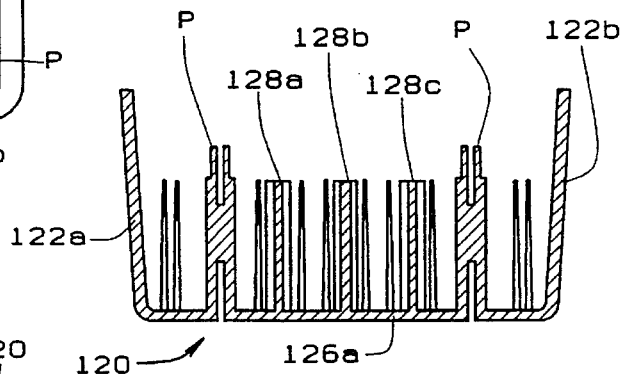
FIG. 21 is a sectional view taken along line 21—21 in FIG. 20.

Referring to FIGS. 20 and 21, a cover 120 in which the circuit boards are mounted is shown to include respective end walls 122a and 122b, and sidewalls 124a, 124b. The cover also includes a front face 126a. A cover plate for the module is not shown. The cover includes three spaced dividers 128a–128c, the dividers extending parallel to each other from one sidewall of the cover to the other. Four posts P project rearwardly from the inner front wall 132 of the cover. Each post has a threaded central bore for attaching the cover plate to the module with screws (also not shown).

FIG. 22 illustrates a partial assembly of module 100 in which the circuit boards 106A–106G are installed in cover 120. As seen therein, a circuit board is installed on each side of each divider 128. The seventh circuit board is installed adjacent end wall 122a of the cover. Assembly of the circuit boards into the cover is accomplished in a manner similar to that described with respect to FIGS. 8–11. That is, a layer of a plasma suppression means, in this instance, a silica sand is poured into the cover. The cover is filled to an initial level comparable to the layer Y1 in FIG. 8. Next, the printed circuit boards 106A–106G are installed in the cover. The boards are installed parallel to each other; while, the elements on each particular board are coplanar. When this done, more sand is poured into the cover until it is filled to a level comparable to that of layer Y2 in FIG. 9. Then, the cover is vibrated to compact the sand. After compaction, the layer of sand is comparable to that of layer Y3 in FIG. 10.

Figure 23:
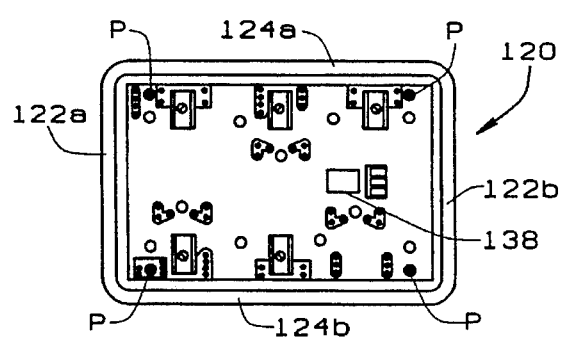

After the above steps are completed, a printed circuit board 131 on which sensing means 146 and a visual indication means 152 are mounted is installed. As shown in FIG. 23, board 131 is mounted over boards 106A–106G so to be at an angle (perpendicular) to them. The length and width dimensions of board 131 generally correspond to that of the cover for the board to fit over the other boards. Once board 131 is mounted in the cover, and appropriate electrical connections made, the entire assembly is covered with an epoxy based insulation material. This results in a module in which generation of plasma is suppressed in the same way as plasma was quenched in the other modules previously described. That is, even if a MOV or a fuse wire vaporizes, the silica sand and epoxy prevent the arc of the plasma from propagating through the module. Thus, the plasma cannot can spread high levels of current to other components within the module.

Sensing means 146 includes a series of opto-isolators 134A–134G. Each opto-isolator is connected to the output of one of the respective suppression assemblies. As noted, the output from each assembly is through the series connected resistors R17 and R18 for that assembly. The input from any suppression assembly 102A–102F to its associated opto-isolator is through two series connected diodes D1 and D2. Suppression assembly 102G's input to its associated opto-isolator 132G is through a diode D3 which is connected in parallel across the LED portion 134 of the opto-isolator.

Visual indication means 152 includes two LEDs D4 and D5, and a solid-state switching circuit 136 for controlling operation of the LEDs. Circuit 136 includes a transistor Q1 whose conduction state is controlled by the switching of any one of the opto-isolators in response to the sensed clearing of a fuse wire 118 in one of the suppression assemblies. LEDs D4 and D5 are each a different color. One LED illuminates red and the other green. Conduction of LED is controlled by the conduction states of respective transistors Q2 and Q3. Under normal conditions, one transistor conducts activating the diode which illuminates green. The other transistor is switched out of conduction at this time so the other LED does not conduct. When a fuse wire clears, the resultant switching of transistor Q1, in turn, causes transistors Q2 and Q3 to switch conduction states. Now, the LED which illuminates green is off, and the LED which illuminates red conducts. By switching from a green light to a red light illumination, in this example, a visual indication is provided to indicate a failure condition exists, and that module 100 should be replaced.

In addition to LEDs D4 and D5, visual indication means 152 further includes a relay 138. As shown in FIG. 23, this relay is also installed on board 131. The relay is switched at the same time transistors Q2 and Q3 are switched in response to a fuse wire clearing or MOV failure. The relay permits a signal to be sent to a remote monitoring location to indicate module failure.

What has been described is a safe TVSS module incorporating circuitry and components which minimize any plasma created in the event of a failure, contain plasma which is created, and absorb or extinguish the plasma so it is not released outside the module. The TVSS modules described are usable with various equipment such as computers. The modules protect this equipment from extremely high voltage surges and transients. The TVSS module is easily installed and provides a visual indication in the event of a fault so the user is aware when a module failure has occurred. Minimizing the amount of plasma created is accomplished by using fast current limiting, by fast arc quenching, by using components capable of withstanding high voltage levels, and by co-ordinating the failure energy of TVSS components with fuses used in the module. For example, use of silver wire fuses having an extremely low oxidation energy compared with other materials substantially reduces the amount of thermal energy released. Further, housing TVSS components such as MOV's and their associated fuse elements separately prevents plasma (the vaporized metal and other ionized gases) from contacting other connections and generating more plasma. Packing the TVSS components and the fuse links in epoxy covered sand allows rapid absorption of any plasma thereby extinguishing it before it can spread. Since all the components in the TVSS module are physically isolated from each other and from the external environment, it is possible to avoid a catastrophic occurrence which could otherwise occur with an extremely high voltage surge or transient. This prevents harm to personnel, equipment, and facilities.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. Transient voltage surge suppressor (TVSS) apparatus for connection to a power line to protect equipment connected to the line from damage in the event of high voltage surges or transients comprising:

semiconductor means connected to the power line, said semiconductor means being normally non-conducting when normal line voltage is supplied thereto, but being switched into conduction by the voltage provided thereto when an overvoltage condition caused by a line surge occurs;

fuse means connected to the semiconductor means to protect the semiconductor means in the event of an excessive current spike caused by a high voltage transient on the line;

module means in which said semiconductor means and said fuse means are installed; and, plasma suppression means substantially completely filling said module means for preventing the spread of a plasma produced if the semiconductor means or the fuse means is destroyed by the line surge or transient, said suppression means including means substantially completely encapsulating both the semiconductor means and fuse means within said module means so plasma produced if either the semiconductor means or fuse means fails is quickly extinguished and thus cannot spread to other components.

2. The apparatus of claim 1 for use in a single or poly-phase power distribution network wherein the apparatus includes a plurality of surge suppression assemblies with each separate surge suppression assembly including said semiconductor means and fuse means connected between each "phase" of a poly-phase distribution network and said module means includes a module cover in which all of the surge suppression assemblies are housed.

3. The apparatus of claim 2 wherein the semiconductor means of each suppression assembly includes a plurality of semiconductors connected in parallel between each of the "phases" and the fuse means includes a fuse wire connected in series with each semiconductor.

4. The apparatus of claim 3 wherein the semiconductors and their associated fuse wires for each suppression assembly are commonly mounted on a circuit board.

5. The apparatus of claim 4 wherein all the circuit boards for the respective suppression assemblies are commonly installed in the module cover.

6. The apparatus of claim 5 wherein respective pairs of circuit boards are installed in the module cover facing each other, and the plasma suppression means includes material means substantially completely filling the spaces between the circuit boards.

7. The apparatus of claim 6 wherein the material means is a clean silica sand of tyler sieve size −60+200 or, other similar packing materials.

8. The apparatus of claim 6 wherein the material means includes a sand, the module cover being filled with a first layer of sand prior to installation of the circuit boards in the module, and to a second and higher level after the boards are installed, the second layer of sand to which the module cover is filled, substantially covering the installed circuit boards.

9. The apparatus of claim 7 further including means for sensing when a semiconductor is destroyed or a fuse wire blows, and means for providing a visual indication thereof.

10. The apparatus of claim 9 wherein the sensing means and visual indication means are commonly mounted on a circuit board, said circuit board being installed in said module cover after said cover is filled with sand.

11. The apparatus of claim 10 in which said plasma suppression means further includes an epoxy material with which said module cover is filled after the circuit board on which said sensing means and said visual indication means are mounted is installed in said module cover.

12. The apparatus of claim 11 wherein the epoxy material is an Insulcast 116 FR Part A/B and Insulcast 116 FR Part A/B FC or, other similar material.

13. The apparatus of claim 11 wherein the fuse wires are made of silver wire.

14. The apparatus of claim 10 wherein the sensing means includes an opto-isolator connected to each surge suppression assembly, the opto-isolator being switched from one operating state to another when a semiconductor in the associated suppression assembly is destroyed or a fuse wire in the assembly is blown.

15. The apparatus of claim 3 wherein said semiconductors are metal-oxide varistors.

16. The apparatus of claim 3 further including means for sensing when a semiconductor is destroyed or a fuse wire is blown, and means for providing a visual indication thereof.

17. The apparatus of claim 16 wherein the visual indication means includes a pair of LED one of which is conducting and the other of which is non-conducting, and a switching circuit for switching the LED which is conducting to its non-conducting state, and the LED which is non-conducting to its conducting state, when a semiconductor is destroyed or a fuse is blown to provide a visual indication of the occurrence.

18. The apparatus of claim 17 wherein said switching circuit includes a plurality of transistors, one of which controls switching of one of the LED, a second of which controls switching of the other LED, and a third of which is responsive to the opto-isolators to switch the conducting states of said first said and second transistors, thereby to switch the operating states of the LED.

19. The apparatus of claim 18 wherein said visual indication means further includes a relay operable by one of said transistors when the operating states of said LEDs are switched to provide an indication to a remote location of the occurrence.

20. A transient voltage surge suppressor for use on a single or poly-phase power distribution network to protect equipment supplied power from the network from damage caused by line surges or transients comprising:

a plurality of surge suppression assemblies each of which includes a plurality of semiconductors connected in parallel and a fuse wire connected in series with each semiconductor, each surge suppression assembly being mounted on a separate circuit board, and a surge suppression assembly being connected between the "phases";

fault detection means including means for sensing when a semiconductor in one of the surge suppression assemblies fails, or when a fuse wire in one of the assemblies blows, and means for providing a visual indication thereof, said fault detection means being mounted on a circuit board separate from the other said circuit boards, a module in which the respective circuit boards are installed, the circuit boards on which said surge suppression assemblies are mounted being installed parallel with each other, and the circuit board on which said fault detection means is mounted being installed at an angle thereto; and, plasma suppression means for preventing spread of a plasma produced when a semiconductor fails or a fuse wire clears, said plasma suppression means including a sand with which the module is filled thereby to substantially completely fill the spaces between the circuit boards on which the surge suppression means are mounted, and an epoxy material with which any remaining space in the module is filled alter the sand is poured into the spaces between said circuit boards and after said circuit board on which said fault detection means is mounted is installed in the module.

* * * * *